US011503029B2

(12) United States Patent
Charvet et al.

(10) Patent No.: US 11,503,029 B2
(45) Date of Patent: *Nov. 15, 2022

(54) METHODS AND SYSTEMS FOR PROVIDING A CUSTOMIZED NETWORK

(71) Applicant: GIGCASTERS, LLC, Round Rock, TX (US)

(72) Inventors: Casey Charvet, Austin, TX (US); George W. Averill, III, Austin, TX (US)

(73) Assignee: GIGCASTERS, LLC, Austin, TX (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/230,879

(22) Filed: Apr. 14, 2021

(65) Prior Publication Data

US 2021/0352070 A1 Nov. 11, 2021

Related U.S. Application Data

(63) Continuation of application No. 16/178,556, filed on Nov. 1, 2018, now Pat. No. 11,019,060.

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *H04L 9/40* | (2022.01) |
| *H04L 67/14* | (2022.01) |
| *H04L 67/02* | (2022.01) |
| *H04L 67/63* | (2022.01) |

(Continued)

(52) U.S. Cl.
CPC .............. *H04L 63/10* (2013.01); *H04L 67/02* (2013.01); *H04L 67/1001* (2022.05); *H04L 67/14* (2013.01); *H04L 67/568* (2022.05); *H04L 67/63* (2022.05)

(58) Field of Classification Search
CPC . H04L 63/10; H04L 67/2842; H04L 67/1002; H04L 67/14; H04L 67/327; H04L 67/02; H04L 63/108; H04L 63/107; H04L 2463/062; H04L 63/062; H04L 63/101; H04L 67/142; H04L 67/146; H04L 67/18; H04L 67/1008
See application file for complete search history.

(56) References Cited

U.S. PATENT DOCUMENTS

2003/0161335 A1* 8/2003 Fransdonk ......... G06Q 20/3823
370/401
2011/0295997 A1* 12/2011 Priyadarshan ......... G06Q 30/00
709/224

(Continued)

*Primary Examiner* — Amie C. Lin
(74) *Attorney, Agent, or Firm* — Stamoulis & Weinblatt LLC (57) ABSTRACT

In some embodiments, a system is a reverse-proxying HTTP cache server that handles user session management and dynamically forwards requests to origin/backend servers based on the content being requested. It caches data from origin servers in order to reduce the stress placed on each origin server. It uses encrypted authorization tokens to handle session management and is able to modify origin data on-the-fly in order to inject per-client authorization information into the data stream. It can enforce maximum concurrent session limits, user bans, limit exemptions, and time-limited live content previews.

15 Claims, 5 Drawing Sheets

(51) Int. Cl.
*H04L 67/568* (2022.01)
*H04L 67/1001* (2022.01)

(56) References Cited

U.S. PATENT DOCUMENTS

2012/0320824 A1* 12/2012 Bari ................ H04W 12/06
  370/328
2016/0065576 A1* 3/2016 Zhang ............. H04L 67/5682
  726/3

* cited by examiner

METHODS AND SYSTEMS FOR PROVIDING A CUSTOMIZED NETWORK

BACKGROUND OF THE INVENTION

1. Field of the Invention

The present invention relates to content delivery, and more particularly, relates to methods and systems for delivering content that provides enhanced authentication scalability.

2. Background

Distributed computer systems, such as a content delivery network ("CDN"), are operated by a service provider, which delivers content on behalf of others.

A CDN typically includes a set of servers and storage devices connected over the Internet or other private or public network. Third parties, such as those that host websites that are associated with one or more content providers, may provide content to one or more of the servers.

The CDN servers may deliver content by sourcing from a local cache, origin, or other CDN server.

A CDN server or other component may include content delivery applications, such as an HTTP proxy server or local monitoring software. Other software applications would include Windows.RTM. Media Server (WMS) or Flash.RTM. server for streaming content.

CDNs also have geographic concerns related to content delivery over the Internet. The shorter the geographic distance the better the transfer of content in many cases. Accordingly, CDNs use locally positioned caching servers that are proximate to the end users. In this way, they offload the content and are optimally positioned to make the transfer of content more cost effective and efficient.

Other advantages of a CDN include reduced infrastructure costs, configuration management, and maintenance. In many cases, content providers pay for the amount of bandwidth used at a time, but resources are typically available to dynamically allocate more bandwidth, as needed.

A significant issue facing origin or content creators is that they do not have access to or control the content from the CDN to the user to the player. In some cases, this lack of control means that content is used illegally, not paid for, or otherwise unauthorized for a particular intended use. One contributing factor to the lack of control is the presence of wireless or Internet Service Providers (ISPs) that control their network and its components. That is, once the content is given to one of the providers, the CDN loses control of the content. This makes it difficult to stop bad actors, prohibit the restreaming/rebroadcast/redistribution of content, prevent valid users sharing access credentials in the form of logins, prevent deep or hot linking, and prevent content fishing—guessing at file names to retrieve content without authorization.

SUMMARY

In one aspect, there is disclosed a control plane network (CPN) system, comprising a server coupled to a network; and a key-value store and an authentication table that is distributed to one or more nodes of the network that enables session tracking and authorization at the one or more nodes of the network and wherein the server comprises a cache that caches one of a playlist and content from an origin server coupled to the server.

The delivery of the content and playlist may be based on at least one of latency, jitter, packet loss, distance, and end user experience. The server may comprise a reverse-proxying HTTP cache server process. The server may be configured to execute user session management.

The server may be configured to dynamically forward one or more requests to an origin server based on the content being requested. The CPN system may include a load balancer. The server may be configured to enforce one of maximum concurrent session limits, user bans, limit exemptions, time-limited live content previews, whitelists, blacklists, and geo-restrictions. The server may be configured to execute session management using one or more authorization tokens, the one or more tokens being one of encrypted and non-encrypted.

The server may be configured to execute authentication or authorization to enable or prevent access to content despite having an authentication token considered valid by one of a content delivery network and a downstream systems. The key-value store may include asynchronous replication integrated with caching of system data between the key-store and one or more caching servers. The server may be configured to dynamically deny access to specific streams of content for a particular user. The server may be configured to deliver the playlist after execution of one of authentication and authorization. The server may be configured to identify a bad actor action.

In another aspect, there is disclosed a server including a processor configured to execute a plurality of instructions stored in a memory coupled to the processor, comprising: a key-value store and an authentication table that is distributed to one or more nodes of a network that enables session tracking and authorization at the one or more nodes of the network and wherein the server comprises a cache that caches one of a playlist and content from an origin server coupled to the server.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Each of the additional features and teachings disclosed below can be utilized separately or in conjunction with other features and teachings to provide a device, system, and/or method for content delivery and control. Representative examples of the present invention, which utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for original disclosure, as well as for the purpose of restricting the claimed subject matter.

Devices, methods, and systems are described for delivery of content and control of such content in an optimal manner, which includes ways content may be delivered from a server to an end user machine over a data network. Delivery of content may be measured by latency, jitter, packet loss, distance, and/or overall end user experience.

Figure 1:
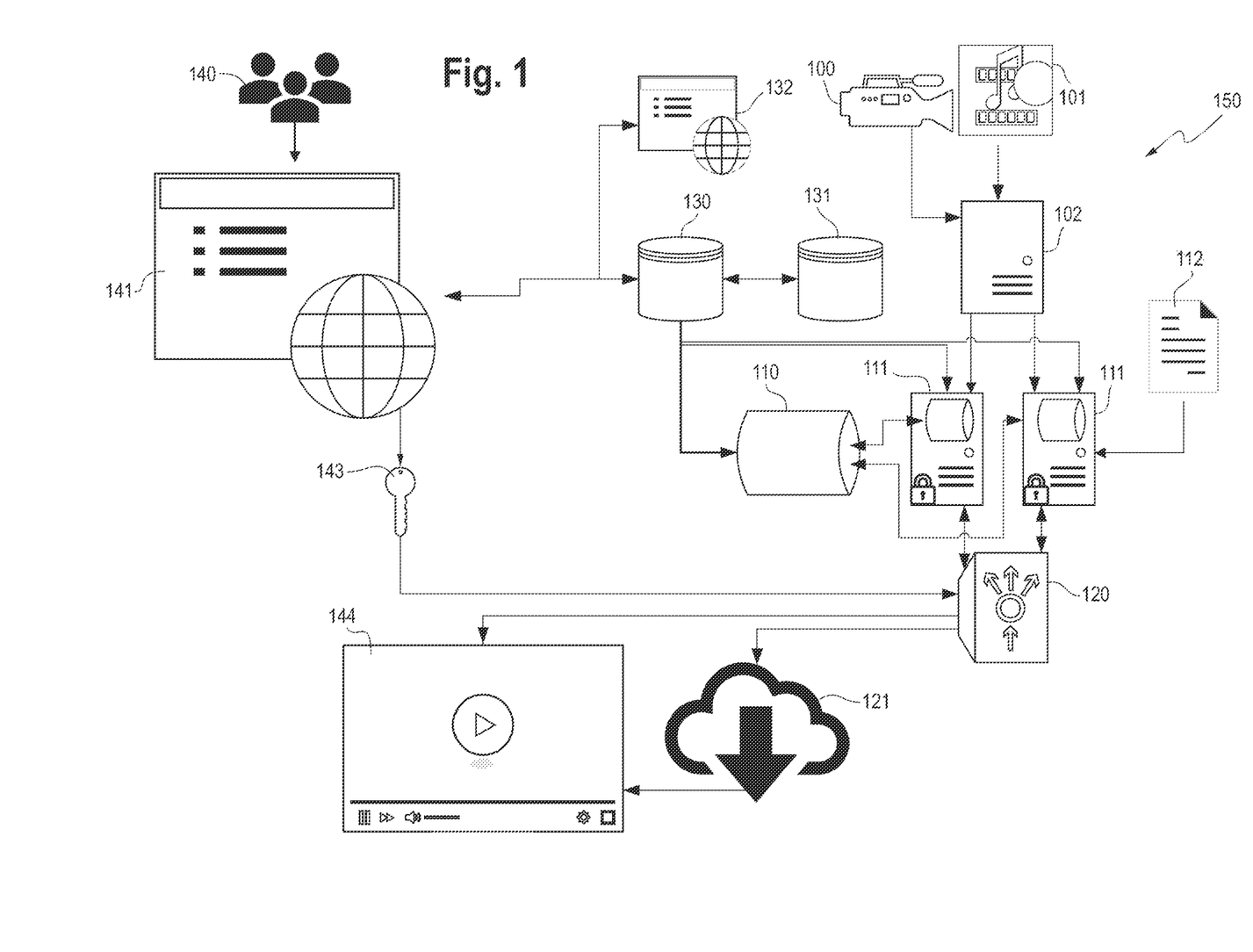
FIG. 1 is a system in accordance with an embodiment.

In one embodiment, a control plane network (CPN) system is a reverse-proxying HTTP cache server, such as server 111, that handles user session management and dynamically forwards requests to origin/backend servers based on the content being requested. In some embodiments, the CPN may include either a key-value store 110 and a load balancer 120 or both. It should be noted that references to a CPN system or a CPN are meant to refer to the same components herein. The CPN may include a microprocessor and a memory, where the microprocessor is programmed for executing specific instructions discussed herein, to perform operations, such as session management, dynamically forwarding and receiving of requests, conducting authorization, providing real-time usage data to an operator, and dynamically routing requests to a redundant data source in case of failure of a primary source.

In some embodiments, the CPN system caches data from origin servers in order to reduce the stress placed on each origin server. Encrypted authorization tokens may be used to handle session management and the CPN system may be able to modify origin data on-the-fly or substantially in real-time in order to inject per-client authorization information into the data stream.

The CPN system may enforce maximum concurrent session limits, user bans, limit exemptions, time-limited live content previews, whitelists, blacklists, or geo-restrictions.

In one embodiment, the CPN system may be employed for real-time usage tracking and analytics, where such tracking may occur between the origin and the CDN. In some embodiments, the CPN system may be used for authentication and/or authorization to enable or prevent access to content despite having an authentication token considered valid by the CDN and downstream systems.

In some embodiments, a content provider may provide the CPN system with a playlist and associated content. The content may be video, audio, digital, analog, text, or other content that may be provided by a content provider. In one embodiment, the CPN system authenticates or validates a token in order to share the playlist. In some embodiments, the CPN system may dynamically deny access to specific streams of content for a particular user or users. In some embodiments, the CPN system may deny access to a single stream of data. In some embodiments, the CPN system may shut off access to more than one stream of content.

The CPN system and methods may also be used for session tracking. In one embodiment, a user's credentials, such as a login and password, may be used to determine the time and location of a user's usage and prevent or allow concurrent usage from one or more places. Other credentials may include an IP address, identification proofing, biometrics, and the like.

In some embodiments, the CPN system may include a key-value store i.e. database that is distributed to one or more nodes that enables session tracking and authorization at that node or scaling and high performance. Each node may have a copy of an authentication table. It should be understood that the term node refers to a device having a unique network address.

In some embodiments, authentication may be performed locally. In some embodiments, the key-value store may be leveraged with asynchronous replication integrated with caching of system data (e.g. origin server routing, authentication and authorization rulesets, session tracking, etc.) between the key-value store and one or more caching servers. Asynchronous replication is a store-and-forward approach to backing up data or data protection. Caching is the process of storing data in a cache. A cache is a temporary storage area.

In some embodiments, the CPN system may cache the playlist and associated content. In other embodiments, the system may only cache the playlist. In some embodiments, the playlist and/or content may be authenticated using encryption and decryption, such as Blowfish or AES. In some embodiments, the server may be configured to deliver the playlist after execution of authentication and authorization. The CPN system may inspect from where the content is coming from, what files are being requested, the name of the content producer, the time at which to expire the user's access to the content, and/or a User ID or session ID. In some embodiments, the server may be configured to assist in identifying a bad actor. Exemplary bad actor actions may include an unauthorized user attempting to circumvent content access restrictions, an unauthorized user attempting to access content using valid credentials shared, copied, or stolen from another user, and/or a user with valid credentials that is violating the terms of service by sharing credentials, sharing, rebroadcasting or restreaming content.

FIG. 1 is system 150 in an embodiment including a live multimedia feed 100. A storage system 101 may include content that is accessible by an origin server 102 that may stream live and recorded content over any public or private network or combination thereof.

The system 150 may also include a key-value store 110 that supports asynchronous leader-follower replication used for tracking sessions, content access entitlement grants, blacklist restrictions, and limited use features e.g. time-limited preview and per-user concurrent session limits. An example of a suitable key-value store may be Redis. A leader-follower replication refers to data that is written to the leader, and the followers replicate the data of the leaders. In some embodiments, the followers may take over and operate independently if the leader fails or is unavailable. Asynchronous may refer to the timing by which the followers replicate the leader data being not strictly enforced, and the followers' copy of data may be out of date relative to the leader until replication has finished. In some embodiments, the tradeoff may occur to allow greater system speed and ability to scale out when it is not essential for the data to always be consistent.

A proxy server 111 may listen to requests from the CDN and/or end-user and determines if the request was presented with the appropriate cryptographic credentials to access the content before requesting and serving the content from origin or serving from high-performance local cache. The server 111 may maintain a distributed copy of the key-value store in 110 for faster checking of access entitlement and restrictions, scalability, and/or load distribution. Alternatively, the system may employ a static list 112 of access credentials in the form of a file or certificate.

The proxy server 111 may request content from one or more origin servers 102. The use of a distributed key-value store allows multiple proxy servers to operate as a cluster to provide scalability and redundancy.

In some embodiments, a load-balancer 120 may accept incoming connections and forward them on to the cluster of proxy servers 111 to and from users directly or utilizing a content delivery network or another series of proxy servers.

By placing authentication between the origin server 102 and the CDN 121, the CPN system provides for continuous, dynamic authentication that may be granted or revoked at any time with arbitrary granularity (e.g. a single user, a set of users, a specific geographic region, time of day, etc.) without interrupting the transmission to other users.

In some embodiments, the system 150 may also include one or more proxy servers 121 or a third-party content delivery network. A content management system database 130 may be included that contains information on the origin server 102 hosting the live or recorded content and the policies dictating which users or members or groups of members (e.g. those purchasing the content or a subscription plan) can access the content.

A user management database 131 may also be utilized by the system to store and manage user identities on behalf of the content rights owner to set access privileges (e.g. if the user is subscribed to a particular package, has purchased a show, or has appropriate security clearance).

In some embodiments, the CPN system may be used to identify a user 140 and grant content access to that user in the event that they access the content through different portals or websites 141. In one embodiment, this may be employed when the user purchases access on one portal or device (e.g. Roku) and wishes to consume the content on another (e.g. Android tablet).

In one embodiment, the content management database 130 and user management database 131 may be combined into a single component.

An administrative web portal 132 used by the content rights owner to configure content metadata and access policies may be included in the system. An end user 140 who consumes the streaming content and uses the website 141 of the content producer or content rights owner may also be included.

The system may also include a service 143 that generates an encrypted content access token for specific content at the request of the website 141 after end user 140 access has been granted. The system may also include a web page or player or app or device 144 that will play-out the requested multimedia content to the end user 140.

The player 144 may be embedded within the web page 141 acting as a portal, or as part of an application on a mobile device, or may stand alone.

FIGS. 2A-2D shows a process in an embodiment for the CPN system. It should be expressly understood that any of the processes shown in FIGS. 2A-2D may be performed individually or in combination with any one or more of the other processes disclosed in each figure in any order. It should be noted that any one of the steps in any of the FIGS. 2A-2D may be optional and conducted in any order. In some embodiments, this process may be referred to as a reverse-proxying HTTP cache server process. That is, in one example, the CPN system is logically or physically closer to the Internet side, such as the origin server, and proxies requests made by the client to an origin server of the CPN system's choosing, as compared to a forward proxy which is closer to the client and proxies requests made by the client to a server, such as an Internet server, of the client's choosing.

Figure 2A:
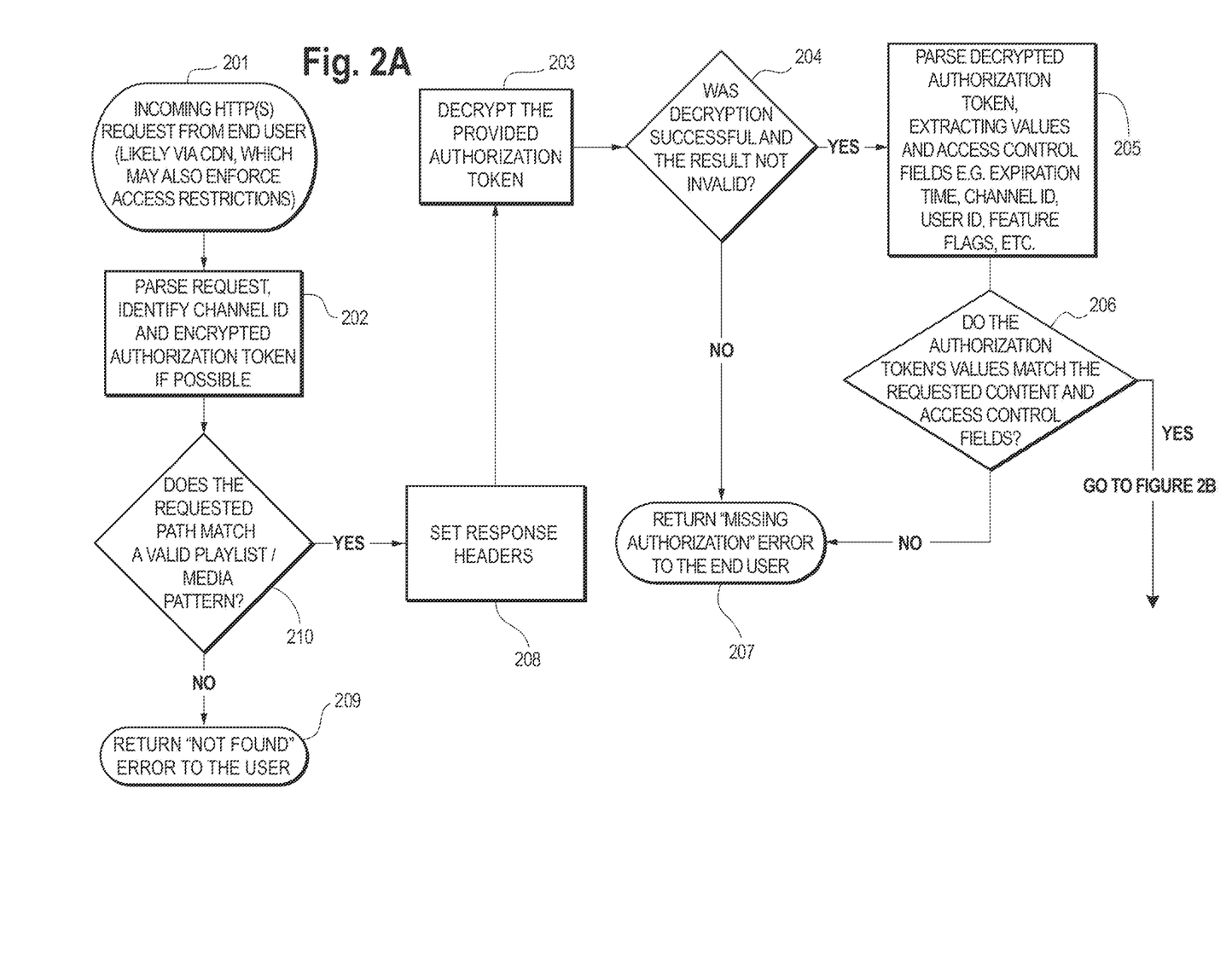
FIGS. 2A-2D are process flow diagrams in accordance with an embodiment.

Referring to FIG. 2A, which shows a CPN system processing and caching logic receive request process in an example, at step 201, an incoming HTTP(S) request from end user (e.g., via CDN, which may also enforce access restrictions) may be received. In some embodiments, the end user may not be requesting via a CDN and may be connecting to the CPN system more directly, bypassing CDN-enforced access restrictions.

At step 202, the request may be parsed to identify channel ID and encrypted authorization token, if possible. At step 210, it is determined if the requested path matches a valid playlist/media pattern. If no, at step 209, a "Not Found" error may be returned to the end user. If a valid playlist/media pattern is found at step 210, at step 208, HTTP response headers may be set that may allow browser scripts to process any response the server sends.

At step 203, the provided authorization token may be decrypted. If the decryption is successful and the result was not invalid at step 204, then at step 205, the CPN system may parse the decrypted authorization token, extracting values and access control fields, e.g. expiration time, channel ID, user ID, feature flags, etc. If the result is invalid at step 204, at step 207, the CPN system may return a "Missing Authorization" error to the end user.

Figure 2B:
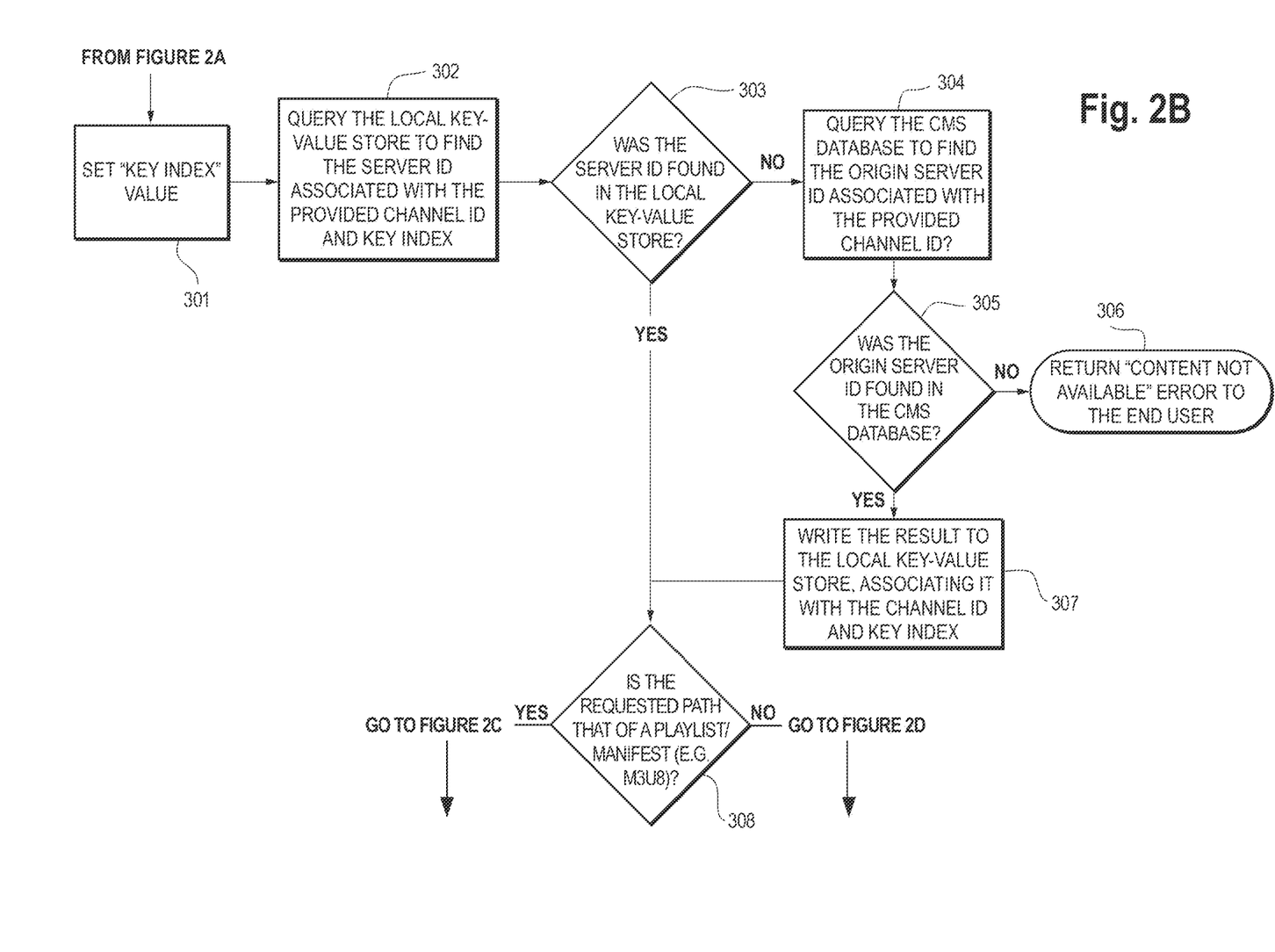

At step 206, it is determined if the authorization token's values match the requested content and access control fields. If no, at step 207, the CPN system may return a "Missing Authorization" error to the end user. If yes, as shown in FIG. 2B, which shows a CPN system processing and an origin server look up in an example, at step 301, a key index value may be set. At step 302, a query of the local key-value store to find the server ID associated with the provided channel ID and key index may be performed. At step 303, it is determined if the server ID was found in the local key-value store. If no, at step 304, the CMS database may be queried to find the origin server ID associated with the provided channel ID. If yes, at step 308, it is determined if the requested path is that of a playlist/manifest (e.g. .m3u8 files).

At step 305, it is determined if the origin server ID is found in the CMS database. If yes, at step 307, the result is written to the local key-value store, associating it with the channel ID and key index. If no, at step 306, a "Content Not Available" error may be returned to the end user.

Figure 2C:
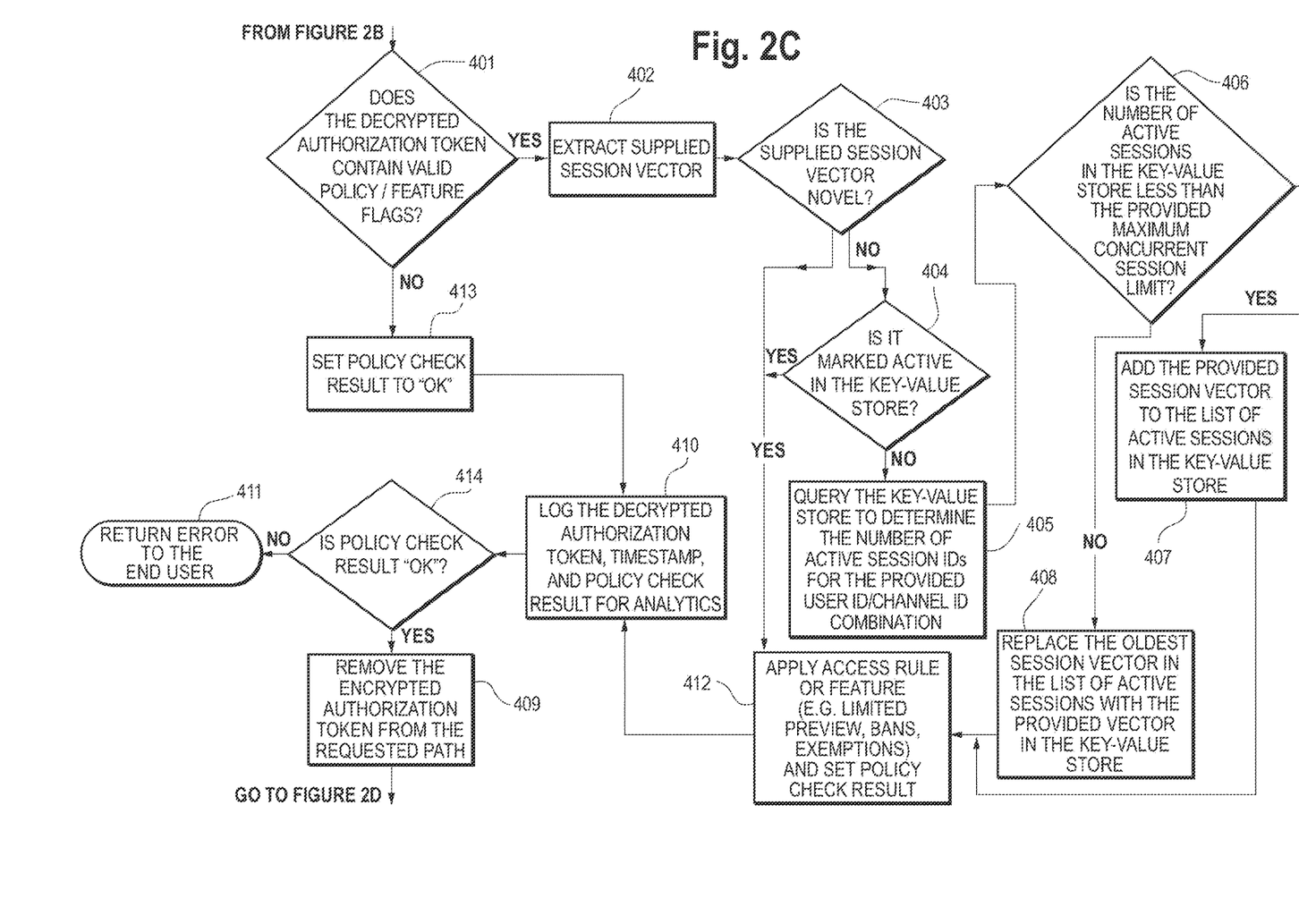

If yes at step 308, at FIG. 2C, which shows a CPN system processing and caching logic applying access control lists in an example, at step 401, it is determined if the decrypted authorization token contains valid policy/feature flags. If yes, at step 402, the supplied session vector may be extracted. If no, at step 413, set the policy check result to "OK" and execute step 410, where the decrypted authorization token, timestamp, and policy check result may be logged for analytics. At step 414, it is determined if the policy result is "OK." If yes at step 414, execute step 409. If no, an error is returned to the end user at step 411.

At step 403, it is determined if the supplied session vector is novel. If yes, at step 412, an access rule or feature (e.g., limited preview, bans, exceptions) is applied and a policy check result is set. At step 410, the decrypted authorization token, timestamp, and policy check result may be logged for analytics.

At step 414, it is determined if the policy check result is "OK." If yes, at step 409, the encrypted authorization token from the requested path may be removed.

If no at step 403, at step 404, it is determined if the vector is marked active in the key-value store. If yes, then execute step 412. If no, at step 405, the key-value store may be queried to determine the number of active session IDs for the provided user ID/channel ID combination. At step 406, it is determined if the number of active sessions in the key-value store is less than the provided maximum concurrent session limit. If yes, at step 407, the provided session vector may be added to the list of active sessions in the key-value store. If no, at step 408, the oldest session vector may be replaced in the list of active sessions with the provided vector in the key-value store.

Figure 2D:
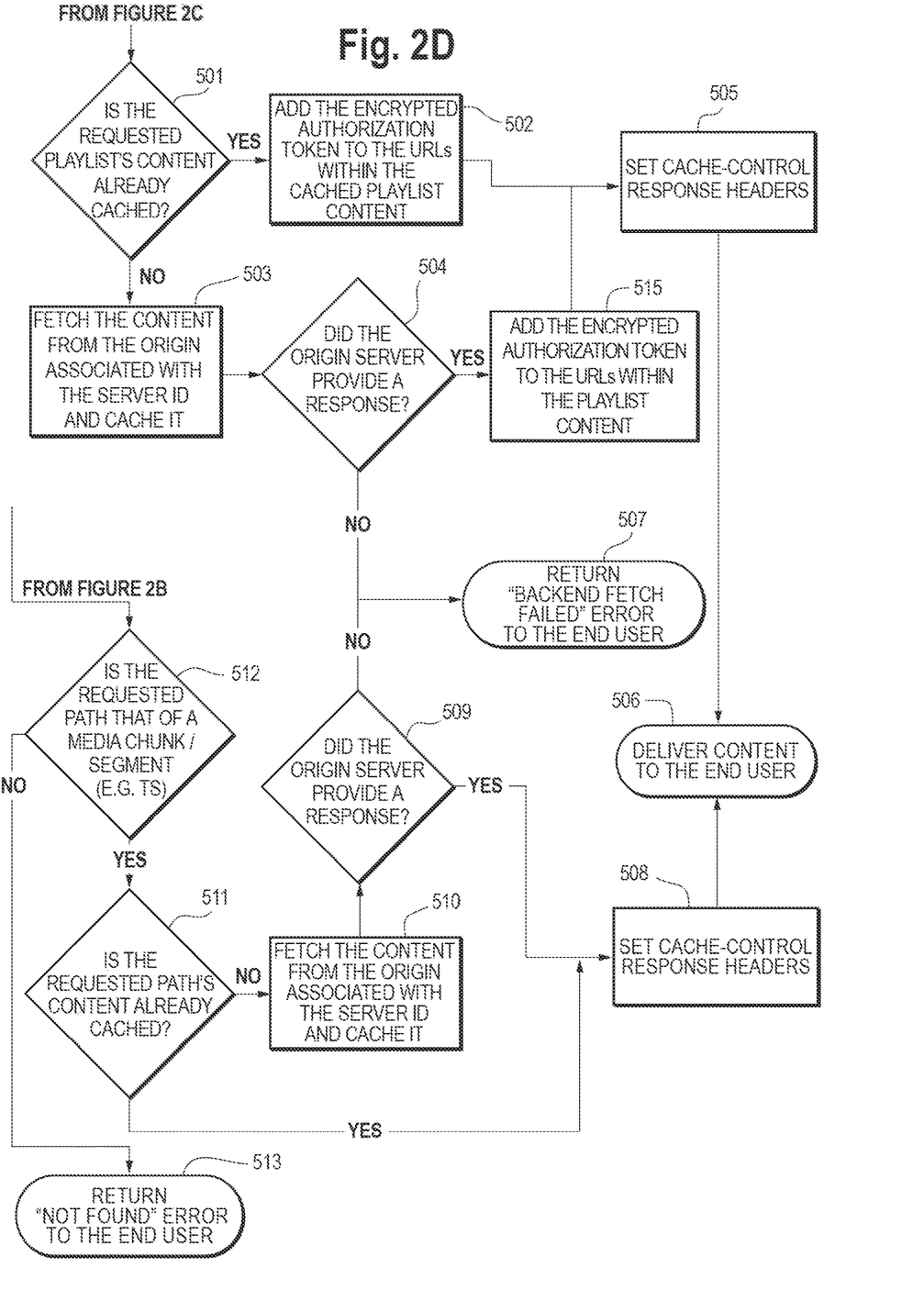

FIG. 2D shows a CPN system processing and caching logic delivery content process in an example. At step 501, it is determined if the requested playlist's content is already cached. If yes, at step 502, the encrypted authorization token may be added to the URLs within the cached playlist content. If no, at step 503, the content may be fetched from the origin associated with the server ID and may be cached.

At step 504, it is determined if the origin server provided a response. If yes, at step 515, the encrypted authorization token may be added to the URLs within the playlist content. At step 505, the Cache-Control response headers may be set. At step 506, the content may be delivered to the end user. If no at step 504, at step 507, a "Backend Fetch Failed" error may be returned to the end user.

At step 512, it is determined if the requested path is that of a media chunk/segment (e.g. .ts files). If no, at step 513 a "Not Found" error may be returned to the end user. If yes at step 512, it is determined at step 511 if the requested path's content is already cached. If yes, at step 508, the Cache-Control response headers may be set. If no at step 511, at step 510, the content may be fetched from the origin associated with the server ID and may be cached. At step 509, it is determined if the origin server provided a response. If yes, execute step 508. If no, at step 507, a "Backend Fetch Failed" error may be returned to the end user.

Below is pseudocode for a CPN process in an embodiment that may programmed and executed by the microprocessor of the CPN system. It is to be expressly understood that the below is only an example.

Client makes a HTTP request (e.g. via a CDN)
Parse requested path, pulling out a channel ID and encrypted authorization token if possible
  NOTE: CDN handles enforcing expiration time, path prefix, and IP restrictions contained within the encrypted authorization token before reaching our HTTP server, but this functionality could also be implemented within the server
If the requested path matches a valid playlist/media pattern:
  Extract the channel ID from the path
  Generate a random integer between 0 and n. This integer will be referred to as "key index" in this process.
  Query the key-value store database to find the origin server ID associated with the provided channel ID and key index
    If not found, query the content management database to find the server ID associated with the provided channel ID
      If not found, return Content Not Available Now
      If found, write the result to the key-value store database, associating it with the channel ID and key index, with a 5 minute (+key index*2 seconds) expiration time set
      NOTE: The use of a key index may help lower the number of simultaneous requests to the content management database
If the requested path is that of a playlist/manifest (e.g. m3u8):
  Decrypt the provided authorization token
    If decryption fails or the result is invalid, return Missing Authorization
  Parse decrypted authorization token, pulling out expiration time, channel ID, user ID, session ID, user IP, maximum concurrent session limit, preview duration, etc.
  If the decrypted authorization token contained a valid preview duration:
    Set PreviewCheckResult to the return value of:
      Consult the key-value store database to determine if the provided session ID/channel ID/user IP combination was replaced by a newer session ID
        If so, return Preview Ended
      Consult the key-value store database to determine if a session ID already exists for the provided channel ID/user IP combination
        If so:
          If the existing session ID matches the provided session ID:
            Return OK
          If not:
            Mark the existing session ID/channel ID/user IP combination as replaced-by-a-newer-session-ID in the key-value store database
            Set the session ID associated with the provided channel ID/user IP combination to the provided session ID in the key-value store database, with an expiration time equal to the remaining time-to-live of the existing channel ID/user IP combination key-value store key
            Return OK
      Consult the key-value store database to determine if a preview ban key exists for the provided channel ID/user IP combination
        If so, return Preview Ended
      Set the preview ban key for the provided channel ID/user IP combination, with an expiration time of 1 hour
      Set the session ID associated with the channel ID/user IP combination to the provided session ID in the key-value store database, with an expiration time equal to the provided preview duration
      Return OK
    Log the decrypted authorization token, timestamp, and PreviewCheckResult to an analytics database
    If PreviewCheckResult is not OK:
      Return PreviewCheckResult
  If not:
    Set AuthCheckResult to the return value of:
      If the provided user ID is empty or NULL, return OK
      Query the key-value store database to determine if an exemption exists for the provided user ID/channel ID combination
        If so, return OK
      Query the key-value store database to determine if a ban exists for the provided user ID/channel ID combination
        If so, return Authorization Suspended Query the key-value store database to determine if a ban exists for the provided session ID/user ID/channel ID combination
    If so, return Session Limit Reached
Query the key-value store database to determine if the provided session ID/user ID/channel ID combination is marked as active
    If not:
        Query the key-value store database to determine the number of active session IDs for the provided user ID/channel ID combination
            If the value is less than the provided maximum concurrent session limit:
                Add the provided session ID/user ID/channel ID combination to the list of active sessions in the key-value store database
            If not:
                Replace the oldest session ID/user ID/channel ID combination in the list of active sessions with the provided session ID/user ID/channel ID combination in the key-value store database
                Mark the replaced session ID/user ID/channel ID combination as banned in the key-value store database
        Return OK
Log the decrypted authorization token, timestamp, and AuthCheckResult to an analytics database
If AuthCheckResult is not OK:
    Return AuthCheckResult
Remove the encrypted authorization token from the requested path
If the requested playlist's content is already cached, add the encrypted authorization token to the URLs within the cached playlist and return the content to the client
If not cached, fetch the content from the origin associated with the server ID, cache it with a 2 second expiration time set (if live content; 5 minutes otherwise), add the encrypted authorization token to the URLs within the playlist, and return the content to the client
If the requested path is that of a media chunk/segment (e.g. is files):
    If the requested path's content is already cached, return the content to the client
    If not cached, fetch the content from the origin associated with the server ID, cache it with a 1 hour expiration time set, and return the content to the client
In general:
If the origin fails to return content (such as if it times out), return a Backend Fetch Failed response
Set Access-Control-Allow-Origin response headers when appropriate in order to allow browsers to access the content
Set appropriate Cache-Control response headers to control caching behavior at the CDN and end-user levels
NOTE: Any references to HTTP can also be interpreted as references to HTTPS The foregoing description of the preferred embodiments of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . . "

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

The invention claimed is:

1. A control plane network (CPN) system, comprising: a reverse proxy server coupled to a network and comprising a memory; a load balancer; a key-value store coupled to the reverse proxy server; and an authentication table; the key-value store and the authentication table being distributed by the CPN system to one or more nodes of the network to enable session tracking and authorization at the one or more nodes of the network;
    wherein the key-value store comprises asynchronous replication integrated with caching of system data between the key-value store and one or more caching servers, the key-value store being queried to determine, based on a provided channel identifier and a key index value, an origin server identifier associated with an origin server coupled to the reverse proxy server;
    wherein the reverse proxy server comprises a cache that caches one of a play list and content from the origin server, the reverse proxy server is configured to perform authentication to enable or prevent access to the content despite having an authentication token considered valid by a content delivery network (CDN), wherein the CPN system is located upstream from the CDN.

2. The CPN system of claim 1, wherein delivery of the content and the play list is based on at least one of latency, jitter, packet loss, distance, and end user experience.

3. The CPN system of claim 1, wherein the reverse proxy server comprises a reverse-proxying HTTP cache server process.

4. The CPN system of claim 1, wherein the reverse proxy server is configured to execute user session management.

5. The CPN system of claim 1, wherein the reverse proxy server is configured to dynamically forward one or more requests to the origin server based on content being requested.

6. The CPN system of claim 1, wherein the reverse proxy server is configured to enforce one of maximum concurrent session limits, user bans, limit exemptions, time-limited live content previews, whitelists, blacklists, and geo-restrictions.

7. The CPN system of claim 1, wherein the reverse proxy server is configured to execute session management using one or more authorization tokens, the one or more authorization tokens being one of encrypted and non-encrypted.

8. The CPN system of claim 1, wherein the reverse proxy server is configured to dynamically deny access to specific streams of the content for a particular user.

9. The CPN system of claim 1, wherein the reverse proxy server is configured to identify a bad actor action.

10. A reverse proxy server coupled to a network comprising: a processor and a memory coupled to the processor, the processor configured to execute a plurality the reverse proxy server is coupled to a key-value store and an authentication table, the key-value store and the authentication table being distributed to one or more nodes of the network to enable session tracking and authorization at the one or more nodes of the network; wherein the key-value store comprises asynchro-nous replication integrated with caching of system data between the key-value store and one or more caching servers, the key-value store being queried to determine, based on a provided channel identifier and a key index value, an origin server identifier associated with an origin server coupled to the reverse proxy server; wherein the reverse proxy server comprises a cache that caches one of a playlist and content from the origin server, the reverse proxy server is configured to perform authentication the reverse proxy server is configured to perform authentication to enable or prevent access to the content despite having an authentication token considered valid by a content delivery network (CDN), wherein the reverse proxy server is coupled to a load balancer and is located upstream from the CDN.

11. The reverse proxy server of claim 10, wherein the processor determines delivery of the content and the playlist based on at least one of latency, jitter, packet loss, distance, and end user experience.

12. The reverse proxy server of claim 10, wherein the processor executes instructions for a reverse-proxying HTTP cache server process.

13. The reverse proxy server of claim 10, wherein the processor executes instructions to dynamically forward one or more requests to the origin server based on content being requested.

14. The reverse proxy server of claim 10, wherein the processor executes instructions for session management using one or more authorization tokens, the one or more authorization tokens being one of encrypted and non-encrypted.

15. The reverse proxy server of claim 10, wherein the processor executes instructions to dynamically deny access to specific streams of the content for a particular user.

* * * * *